US010137848B2

(12) United States Patent
DeCia et al.

(10) Patent No.: US 10,137,848 B2
(45) Date of Patent: Nov. 27, 2018

(54) SYSTEM IDENTIFYING A DRIVER BEFORE THEY APPROACH THE VEHICLE USING WIRELESS COMMUNICATION PROTOCOLS

(71) Applicant: Ford Global Technologies, LLC, Dearborn, MI (US)

(72) Inventors: Nunzio DeCia, Northville, MI (US); Stephen Jay Orris, Jr., New Boston, MI (US); David A. Herman, Southfield, MI (US); Nicholas Alexander Scheufler, Flat Rock, MI (US); Richard D. Bridgewater, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/994,861

(22) Filed: Jan. 13, 2016

(65) Prior Publication Data

US 2017/0197568 A1     Jul. 13, 2017

(51) Int. Cl.
  *B60R 16/037*   (2006.01)
  *H04W 52/02*    (2009.01)
  *G01S 19/42*    (2010.01)

(52) U.S. Cl.
  CPC ............ *B60R 16/037* (2013.01); *G01S 19/42* (2013.01); *H04W 52/0258* (2013.01); *Y02D 70/00* (2018.01); *Y02D 70/1222* (2018.01); *Y02D 70/1242* (2018.01); *Y02D 70/1262* (2018.01); *Y02D 70/142* (2018.01);
  (Continued)

(58) Field of Classification Search
  CPC .................. B60R 16/037; H04W 52/0258
  See application file for complete search history.

(56) References Cited

U.S. PATENT DOCUMENTS

| 6,185,487 B1 | 2/2001 | Kondo et al. |
| 2005/0125148 A1* | 6/2005 | Van Buer ............ G01C 21/3617 701/468 |

(Continued)

FOREIGN PATENT DOCUMENTS

| FR | 2901298 A1 | 11/2007 |
| JP | 2009234318 A | 10/2009 |

OTHER PUBLICATIONS

Search Report dated Jul. 5, 2017 for GB Patent Application No. GB1700467.2 (5 Pages).

*Primary Examiner* — Anshul Sood
(74) *Attorney, Agent, or Firm* — James P. Muraff; Neal, Gerber & Eisenberg LLP

(57) ABSTRACT

A vehicle wireless beacon scheduling system is disclosed. In one embodiment, the system includes a vehicle including steering, an accelerator, brakes, a processor, and memory. The system also includes a beacon optimizer module coupled to the processor comprising driver driving pattern data stored in the memory, and a beacon scheduler module coupled to the processor and configured to transmit Bluetooth Low Energy (BLE) data from the vehicle in advance of a predicted trip in the vehicle by a driver based on the driver driving pattern data. The beacon scheduler module is configured to dynamically adjust at least one of a transmission time, a transmission rate, and a transmission duration of the BLE data from the vehicle based on a probability of a trip taken by the driver in the vehicle.

22 Claims, 6 Drawing Sheets

(52) U.S. Cl.
CPC .......... *Y02D 70/144* (2018.01); *Y02D 70/146* (2018.01); *Y02D 70/164* (2018.01); *Y02D 70/166* (2018.01)

(56) References Cited

U.S. PATENT DOCUMENTS

| | | |
|---|---|---|
| 2013/0226371 A1 | 8/2013 | Rovik et al. |
| 2013/0274993 A1* | 10/2013 | Gregg .................... G07C 5/085 701/33.4 |
| 2013/0345961 A1 | 12/2013 | Leader et al. |
| 2014/0006137 A1* | 1/2014 | Melen ................ G06Q 10/1093 705/14.35 |
| 2014/0114532 A1 | 4/2014 | Choi et al. |
| 2014/0188348 A1 | 7/2014 | Gautama et al. |
| 2014/0240091 A1 | 8/2014 | Talty et al. |
| 2014/0278086 A1 | 9/2014 | San Filippo et al. |
| 2015/0002263 A1 | 1/2015 | Ayeva et al. |
| 2015/0161834 A1* | 6/2015 | Spahl .................. G07C 9/00111 340/5.61 |
| 2016/0171885 A1* | 6/2016 | Lynch .................. G08G 1/0129 701/117 |
| 2016/0244010 A1 | 8/2016 | Tseng et al. |

\* cited by examiner

SYSTEM IDENTIFYING A DRIVER BEFORE THEY APPROACH THE VEHICLE USING WIRELESS COMMUNICATION PROTOCOLS

BACKGROUND

This application relates generally to the field of wireless vehicle communication systems, and more particularly to systems and methods for optimizing wireless communications between a vehicle and a given driver of the vehicle.

Various vehicle features may require wireless communication to transmit or receive data that may occur prior to a driver's entry into the vehicle. This communication requires power and must be kept to a minimum to conserve vehicle battery life.

Types of wireless communication between the driver and the vehicle can include Bluetooth Low Energy (BLE) signals for identifying and authenticating a driver approaching the vehicle, and pre-loading or pre-configuring various vehicle settings and information prior to entry into the vehicle.

To identify and authenticate a driver of a vehicle prior to entry into the vehicle, a periodic low-energy wireless connection protocol may be utilized. The connection protocol may include the use of a BLE beacon that pings at a periodic rate to determine whether a driver of the vehicle is in a designated vicinity of the vehicle. The beacon may utilize vehicle electrical power to produce such pings, and the amount of power is relative to the rate and energy level at which the beacon pings. However, transmitting pings when a driver has no need or intention to drive the vehicle needlessly wastes vehicle electrical power.

There exists a need, therefore, to predict a driver's departure in the vehicle to minimize vehicle power usage while also maximizing the detection accuracy of the approaching driver.

SUMMARY

A vehicle wireless beacon scheduling system is disclosed. In one embodiment, the system includes a vehicle including steering, an accelerator, brakes, a processor, and memory. The system includes a beacon optimizer module coupled to the processor and configured to record a driver's driving patterns of the vehicle and to preconfigure and/or activate one or more driver settings of the vehicle in advance of a predicted trip in the vehicle by the driver according to the driver's driving patterns.

The beacon optimizer module may be configured to receive real-time data and/or historical data comprising the driver's parking and driving patterns. The real-time data and/or historical data may include at least one of a trip start time, an originating location of the vehicle, a distance driven in the trip, a destination to which the vehicle is driven, location data including discrete geo-location data of the vehicle along a path driven, a duration of the trip, a duration of any temporary stops taken along a path driven, a location of such temporary stops, and an identity of a landmark or an address at or near each such temporary stop, the originating location, and the final destination. The real-time data and/or historical data may include GPS position data and time data associated with each position data of the vehicle. The real-time data and/or historical data may include at least one of driver calendar data and driver social media data.

The beacon optimizer module may include a driver data module coupled to the processor and configured to wirelessly synchronize the driver calendar data and the driver social media data residing in memory on the vehicle with the driver calendar data and the driver social media data residing in memory on a cloud storage device. The beacon optimizer module may include a departure prediction module coupled to the processor and configured to determine a vehicle departure probability for a determined time of day and day of week based on the synchronized driver calendar data and the driver social media data.

The beacon optimizer module may include a driver heat map module coupled to the processor and configured to identify a driver's driving patterns of the vehicle. The driver heat map module may be configured to determine whether a driven distance of the trip from origin to the destination as measured linearly from the origin exceeds a threshold amount, such as 1 km. The beacon optimizer module may include a departure prediction module coupled to the processor and configured to determine a vehicle departure probability for a determined time of day and day of week based on the driver's parking and driving patterns.

The beacon optimizer module may include a ping rate optimizer module coupled to the processor and configured to dynamically modify at least one of a transmission time, a transmission rate, and a transmission duration of Bluetooth Low Energy (BLE) signals in a vicinity of the vehicle based on the vehicle departure probability.

The driver heat map module may be configured to register a presence of the driver in the vicinity of the vehicle. The system may include a beacon scheduler module coupled to the processor and configured to transmit BLE signals from the vehicle at the modified transmission time, transmission rate, and over the transmission duration.

Another embodiment of a vehicle wireless beacon scheduling system is disclosed. In this embodiment, the system includes a vehicle including steering, an accelerator, brakes, a processor, and memory. The system also includes a beacon optimizer module coupled to the processor comprising driver driving pattern data stored in the memory, and a beacon scheduler module coupled to the processor and configured to transmit Bluetooth Low Energy (BLE) data from the vehicle in advance of a predicted trip in the vehicle by a driver based on the driver driving pattern data. The beacon scheduler module is configured to preconfigure at least one driver setting of the vehicle in advance of the predicted trip in the vehicle in response to a detection of the driver in a vicinity of the vehicle via the BLE data.

The driver's driving patterns may include at least one of a trip start time, an originating location of the vehicle, a distance driven in the trip, a destination to which the vehicle is driven, location data including discrete geo-location data of the vehicle along a path driven, a duration of the trip, a duration of any temporary stops taken along a path driven, a location of such temporary stops, and an identity of a landmark or an address at or near each such temporary stop, the originating location, and the final destination.

The beacon optimizer module may include a driver data module coupled to the processor and configured to wirelessly synchronize a driver calendar data and a driver social media data residing in memory on the vehicle with the driver calendar data and the driver social media data residing in memory on a cloud storage device. The beacon optimizer module may include a departure prediction module coupled to the processor and configured to determine a probability of departure in the vehicle based on the driver driving pattern data.

The beacon optimizer module may include a departure prediction module coupled to the processor and configured to determine a probability of departure in the vehicle based on the synchronized driver calendar data and the driver social media data.

Another embodiment of a vehicle wireless beacon scheduling system is disclosed. In this embodiment, the system includes a vehicle including steering, an accelerator, brakes, a processor, and memory. The system also includes a beacon optimizer module coupled to the processor comprising driver driving pattern data stored in the memory, and a beacon scheduler module coupled to the processor and configured to transmit Bluetooth Low Energy (BLE) data from the vehicle in advance of a predicted trip in the vehicle by a driver based on the driver driving pattern data. The beacon scheduler module is configured to dynamically adjust at least one of a transmission time, a transmission rate, and a transmission duration of the BLE data from the vehicle based on a probability of a trip taken by the driver in the vehicle.

The beacon optimizer module may include a departure prediction module coupled to the processor and configured to determine the probability of departure in the vehicle based on the driver driving pattern data. The beacon optimizer module may be configured to preconfigure and/or activate one or more driver settings of the vehicle in advance of the predicted trip in the vehicle by the driver.

DETAILED DESCRIPTION

Figure 1A:
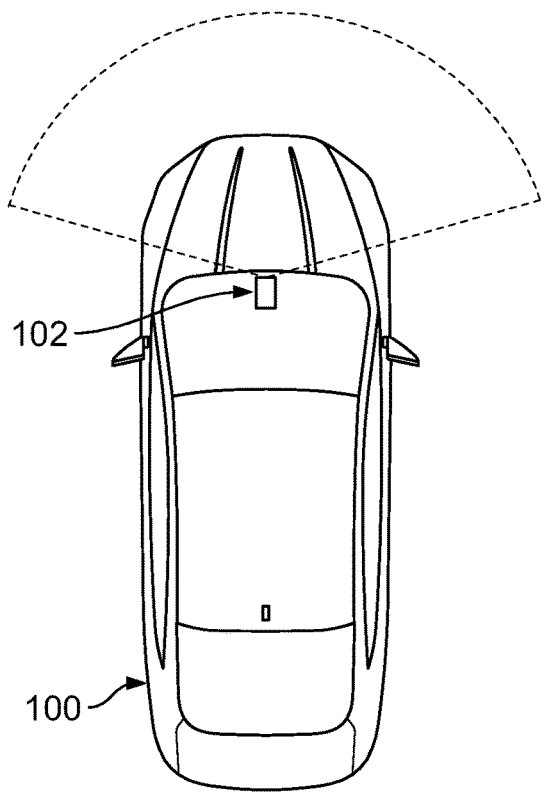
FIG. 1A illustrates a top view of a vehicle of the instant disclosure.

Although the figures and the instant disclosure describe one or more embodiments of a wireless beacon scheduling system, one of ordinary skill in the art would appreciate that the teachings of the instant disclosure would not be limited to these embodiments.

Turning now to the drawings wherein like reference numerals refer to like elements, there are shown exemplary embodiments and methods of a system for scheduling a vehicle wireless beacon to obtain one of a plurality of benefits, including minimization of vehicle power usage while also maximizing the detection accuracy of an approaching driver of the vehicle.

Figure 1B:
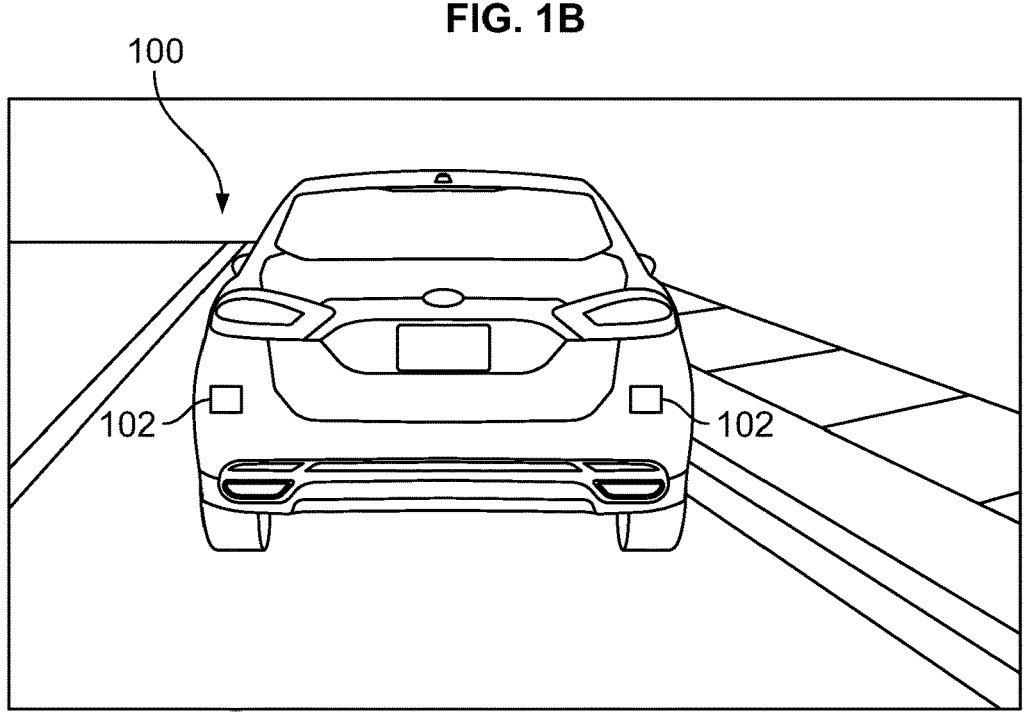
FIG. 1B illustrates a rear view of the vehicle shown in FIG. 1A.

FIGS. 1A-1B show vehicle 100 in accordance with one embodiment of the instant disclosure. In this embodiment, vehicle 100 is an automobile, though in other embodiments vehicle 100 may be any suitable vehicle (such as a truck, a watercraft, or an aircraft). Vehicle 100 may be a gasoline powered vehicle, a hybrid vehicle, an electric vehicle, a fuel cell vehicle, or any other type of suitable vehicle. Vehicle 100 may include standard features, such as a dashboard, adjustable seats, one or more batteries, an engine or motor, a transmission, an HVAC system including a compressor and electronic expansion valve, a windshield and/or one or more windows, doors, a rear view mirror, a right side view mirror, a left side view mirror, seatbelts, airbags, wheels, and tires.

Figure 2:
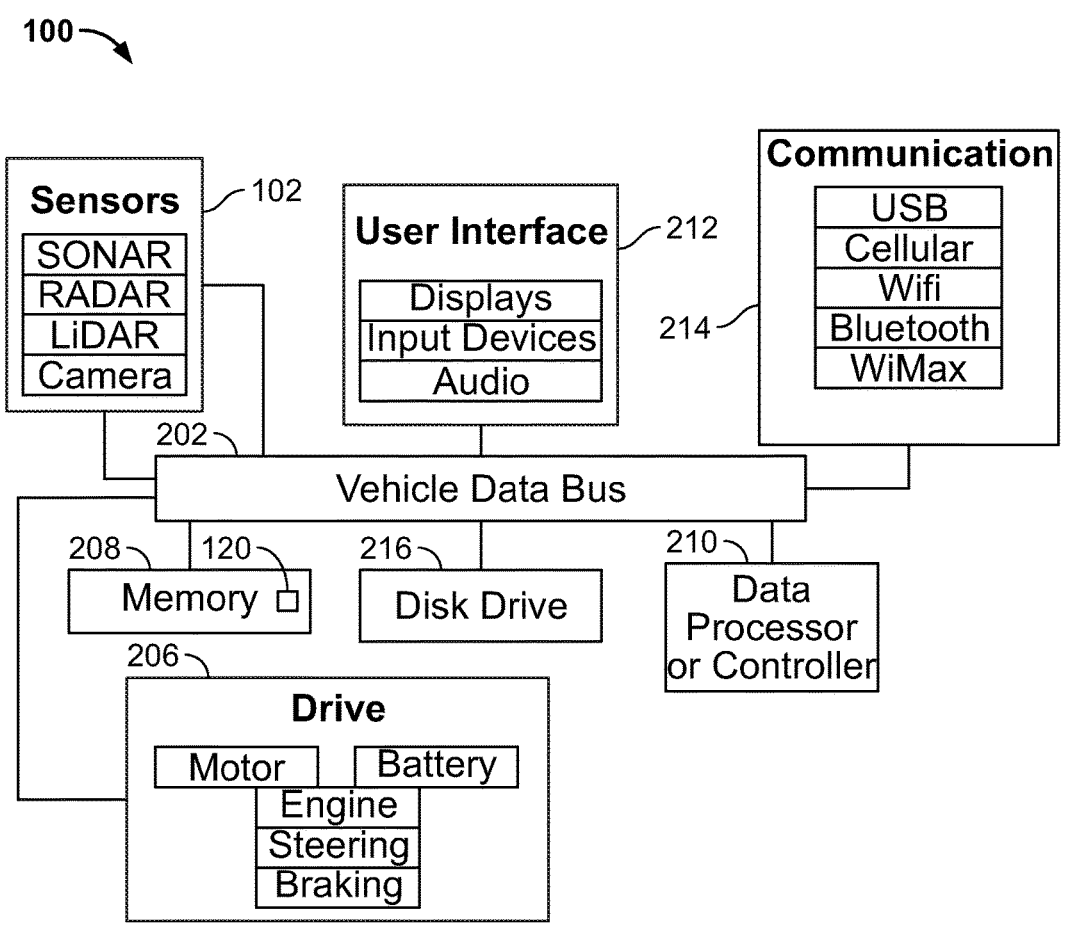
FIG. 2 illustrates a block diagram of exemplary components of the vehicle shown in FIG. 1A.

As shown in FIGS. 1A-1B and 2, vehicle 100 may include sensors 102, which may be arranged in and around the vehicle in a suitable fashion. Sensors 102 can all be the same or they can vary from one to the next. Sensors 102 may include many sensors or only a single sensor.

Certain of the sensors 102 may be configured to obtain data about the environment surrounding the vehicle (e.g., position sensors or weather sensors), as indicated by the dashed line in FIG. 1A, while others obtain data about components of the vehicle itself (e.g., gas level sensors or oil pressure sensors). The sensors 102 may be configured to transmit the data they obtain to one or more controllers of the vehicle 100, such as to controller 210 (described below), for further processing. The sensors 102 may include any suitable sensor or sensors such as, but not limited to: (1) infrared sensors; (2) visual sensors (such as cameras); (3) ultrasonic sensors; (4) RADAR; (5) LIDAR; (6) laser-scan sensors; (7) inertial sensors (for example, an inertial measurement unit); (8) wheel speed sensors; (9) road condition sensors (to directly measure certain road conditions); (10) rain sensors; (11) suspension height sensors; (12) steering wheel angle sensors; (13) steering torque sensors; (14) brake pressure sensors; (15) tire pressure sensors; or (16) vehicle location or navigation sensors (such as a Global Positioning System). Sensors 102 may include gear sensors configured to detect gear engagement of the vehicle's transmission, accelerometers configured to detect vehicle acceleration, speed sensors to detect vehicle speed, wheel speed, and/or steering wheel speed, torque sensors to detect engine or motor output torque, driveline torque, and/or wheel torque, and position sensors to detect steering wheel angular position, brake pedal position, and/or mirror position. Some sensors 102 may be mounted inside the passenger compartment of vehicle 100, around the exterior of the vehicle, or in the engine compartment of vehicle 100. At least one sensor 102 may be used to identify the vehicle's driver via facial recognition, speech recognition, or communication with a device, such as a vehicle key or mobile phone personal to the driver.

Sensors 102 may have an OFF state and various ON states. Vehicle 100, or a device operatively connected to the vehicle, may be configured to control the states or activity of the sensors. It should be appreciated that the term "internal sensors" includes all sensors mounted to the vehicle, including sensors that are mounted to an exterior of vehicle 100.

As shown in FIG. 2, in one embodiment, vehicle 100 includes a vehicle data bus 202 operatively coupled to sensors 102, vehicle drive devices 206, memory or data storage 208, a processor or controller 210, a user interface 212, communication devices 214, and a disk drive 216.

The processor or controller 210 may be any suitable processing device or set of processing devices such as, but not limited to: a microprocessor, a microcontroller-based platform, a suitable integrated circuit, or one or more application-specific integrated circuits (ASICs).

The memory 208 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, memristor-based non-volatile solid-state memory, etc.); unalterable memory (e.g., EPROMs); read-only memory; a hard drive; a solid state hard drive; or a physical disk such as a DVD. In an embodiment, the memory includes multiple kinds of memory, particularly volatile memory add non-volatile memory.

The communication devices 214 may include a wired or wireless network interface to enable communication with an external network. The external network may be a collection of one or more networks, including standards-based networks (e.g., 2G, 3G, 4G, Universal Mobile Telecommunications Autonomous valet parking system (UMTS), GSM (R) Association, Long Term Evolution (LTE) (TM), or more); WMAX; Bluetooth; near field communication (NFC); WiFi (including 802.11 a/b/g/n/ac or others); WiGig; Global Positioning System (GPS) networks; and others available at the time of the filing of this application or that may be developed in the future. Further, the external network(s) may be a public network, such as the Internet; a private network, such as an intranet; or combinations thereof, and may utilize a variety of networking protocols now available or later developed including, but not limited to, TCP/IP-based networking protocols. The communication devices 214 may also include a wired or wireless interface to enable direct communication with an electronic device, such as a USB or Bluetooth interface.

The user interface 212 may include any suitable input and output devices. The input devices enable a driver or a passenger of vehicle 100 to input modifications or updates to information shown in, for example, a vehicle display. The input devices may include, for instance, a control knob, an instrument panel, a keyboard, a scanner, a digital camera for image capture and/or visual command recognition, a touch screen, an audio input device (e.g., cabin microphone), buttons, a mouse, or a touchpad. The output devices may include instrument cluster outputs (e.g., dials, lighting devices), actuators, a display (e.g., a liquid crystal display ("LCD"), an organic light emitting diode ("OLED"), a flat panel display, a solid state display, a cathode ray tube ("CRT"), or a heads-up display), and speakers. It should be appreciated that the term pressing a button or feature also includes pressing or activating a virtual button or feature, such as using a mouse to click on an item on a display, or pressing a virtual button on a touch screen.

The disk drive 216 is configured to receive a computer readable medium. In certain embodiments, the disk drive 216 receives the computer-readable medium on which one or more sets of instructions, such as the software for operating system 400 described below. The instructions may embody one or more of the methods or logic as described herein. In a particular embodiment, the instructions may reside completely, or at least partially, within any one or more of the main memory 208, the computer readable medium, and/or within the processor 210 during execution of the instructions.

The term "computer-readable medium" should be understood to include a single medium or multiple media, such as a centralized or distributed database, and/or associated caches and servers that store one or more sets of instructions. The term "computer-readable medium" also includes any tangible medium that is capable of storing, encoding or carrying a set of instructions for execution by a processor or that cause a system to perform any one or more of the methods or operations disclosed herein.

In one embodiment, the vehicle 100 includes a one or more computer programs or subprograms 120 stored in the memory 208. When executed by the processor, the one or more computer programs or subprograms 120 generate or select instructions for other elements of the vehicle to perform. In various embodiments, the one or more computer programs or subprograms 120 are configured to direct instructions to the user interface 212, the communication devices 214, the vehicle drive 206, the sensors 102, the processor 210, and any other component operatively connected to the vehicle data bus 202. It should be appreciated that vehicle 100 may be fully autonomous or partially autonomous.

Figure 3:
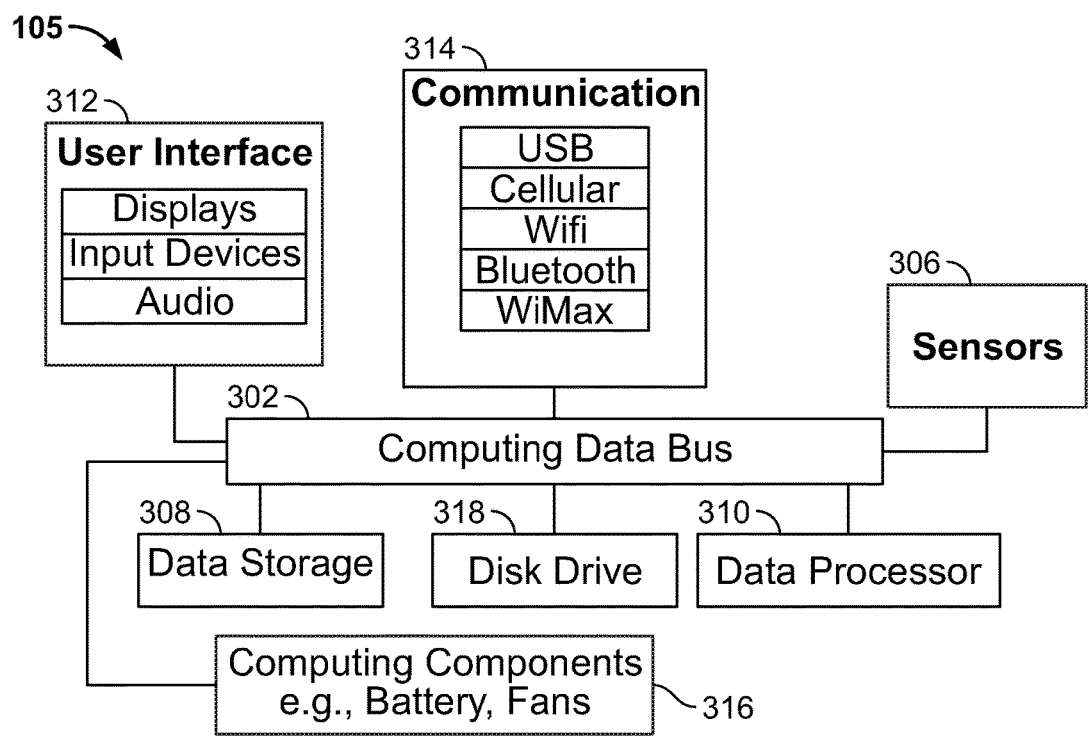
FIG. 3 illustrates a block diagram of an exemplary computing device operatively connected to the vehicle shown in FIG. 1A.

In various embodiments, a computing device 105 is operatively connected to the vehicle 100 via any suitable data connection such as WFi, Bluetooth, USB, or a cellular data connection. In one embodiment, shown in FIG. 3, the computing device 105 includes a data bus 302, operatively coupled to sensors 306, components 316, memory or data storage 308, a processor or controller 310, a user interface 312, and communication devices 314. It should be appreciated that the features of the computing device 105 may be similar to the features of the vehicle 100 as described above. For example, the communication devices 314 of the computing device 105 may operate similar to the communication devices 214 of the vehicle 100. The same applies to the user interface 312, the sensors 306, the data storage 308, the processor 310, and the disk drive 318. In various embodiments, the computing device 105 is a mobile phone or a server.

Figure 4:
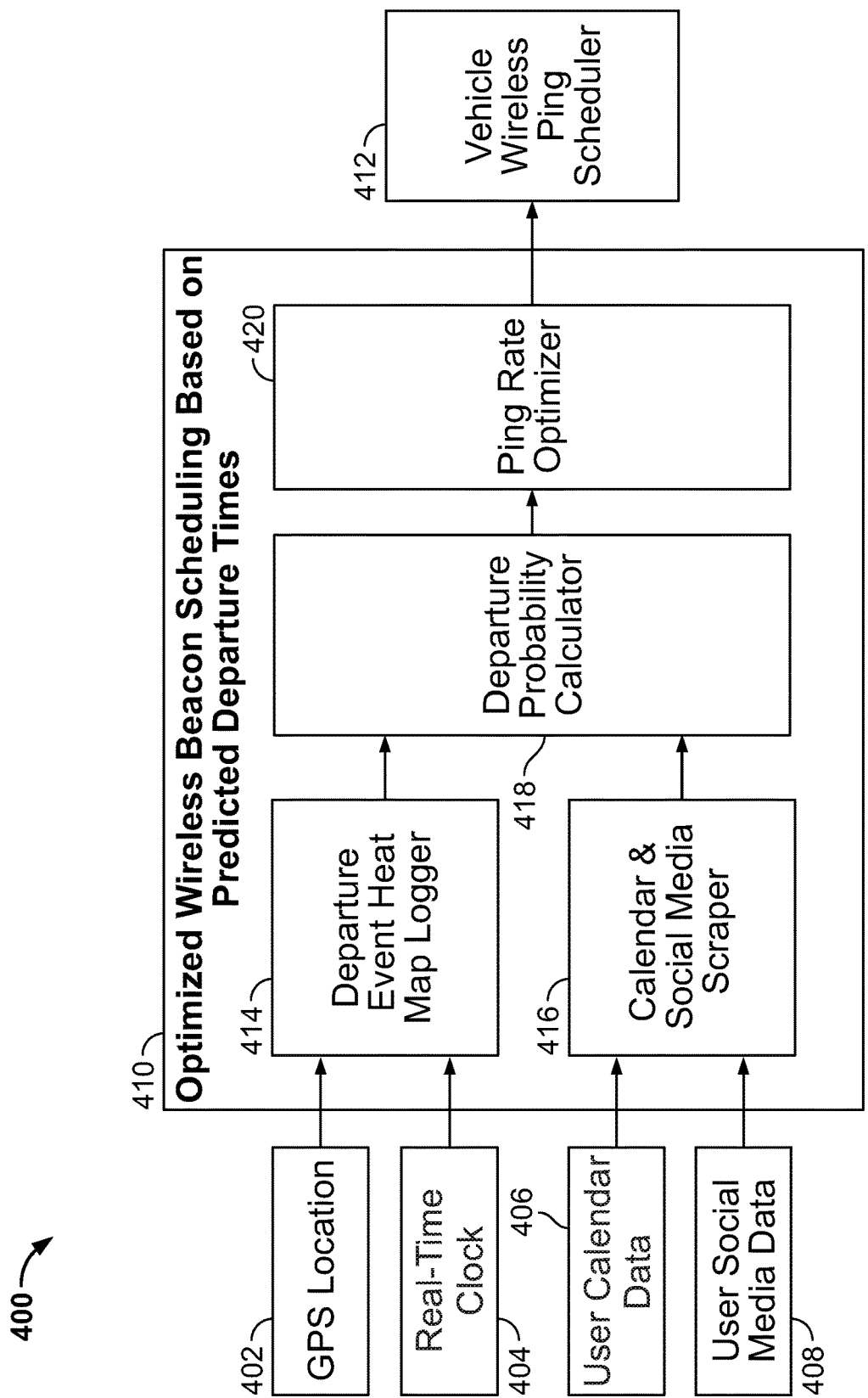
FIG. 4 illustrates a block diagram of one embodiment of a vehicle wireless beacon scheduling system of the instant disclosure.

Turning to FIG. 4, there is shown a block diagram of an embodiment of a vehicle wireless beacon scheduling system 400. System 400 includes one or more data inputs, beacon optimizer module 410, and beacon scheduler module 412. In this embodiment, the one or more data inputs to system 400 include GPS location data 402, time data 404, user calendar data 406, user social media data 408. In this embodiment, beacon optimizer module 410 of system 40 includes user heat map module 414, user data module 416, user departure prediction module 418, and ping optimizer module 420.

System 400 may be configured to determine one or more probable departure times for a predetermined driver of vehicle 100. Based on that information, system 400 may be configured to schedule the emission from vehicle 100 of one or more Bluetooth Low Energy (BLE) signals at an optimized rate, time of day, and day of month to minimize vehicle battery usage while maximizing the likelihood of reaching the driver's receiving device, such as a key fob, as early as possible on approach of the driver to vehicle 100 to enable system 400 to set in motion the preloading, preconfiguring, or activation of any one or more of a plurality of settings or controls of vehicle 100. Such settings or controls may include, but are not limited to, vehicle remote start activation, climate control settings including temperature and fan settings, seat heating and cooling settings, seat position settings, steering wheel position settings, brake pedal position settings, audio settings including audio source input, volume control, etc., display settings, infotainment settings, navigation settings, door lock settings, trunk open/close settings, and lighting settings including cabin lighting settings and external lighting settings. Such settings or controls may be configured and/or controlled by one or more respective vehicle modules, such as a vehicle infotainment system module including an Accessory Protocol Interface Module (APIM), a cellular modem module including a Telematics Control Unit (TCU), an electric climate module including an Electronic Temperature Control (EATC), a body control module, and a driver seat module, to name a few. Each of the foregoing modules and any others may be configured to communicate with system 400 and vice versa to control the foregoing settings or controls of vehicle 100.

To predict a driver's probable departure times in vehicle 100, including the probable departure time in a given day, the probable departure day in a given week, and the probable departure day in a given month, system 400 may be configured to learn the driver's driving patterns. To learn the driver's driving patterns, system 400 may receive one or more input data, which may be real-time data or which may be historical data. In the embodiment of FIG. 4, user heat map module 414 of beacon optimizer module 410 of system 400 is configured to receive a real-time data or historical data associated with the driver. The input data may include the identity of the driver and/or of the driver's portable electronic device configured to receive BLE signals, the trip start time, the originating location of vehicle 100, the distance driven in the trip, the destination to which vehicle 100 is driven, location data including discrete geo-location data of vehicle 100 along the path driven, the duration of the trip, the duration of any temporary stops taken along the route, the location of such temporary stops, and the identity or approximate identity and/or address and/or geo-location of, for example, landmarks, homes, businesses, gas stations, markets, parks, fields, airports, bus stations, train stations, parking lots or garages, and stadiums at or near each such temporary stop, the originating location, and/or the final destination. In the embodiment shown in FIG. 4, system 400 receives at least GPS location data 402 and time data 404.

System 400 may be configured to record the driver's driving patterns, and log in memory 208 some or all, or one or more portions of some or all, trips taken in vehicle 100. In some embodiments, system 400 logs only those trips that exceed a selected threshold, such as driving distance or driving duration. In one embodiment, the threshold may be met by driving the vehicle 100 at least 1 km from its originating location. In another embodiment, the threshold may be met by driving the vehicle 100 at least 1 km, as measured radially from its originating location. System 400 may be programmed to log any trip of any distance or any duration as desired to obtain a statistically relevant dataset from which to predict the driver's future trips in vehicle 100. In one embodiment, at least 50 trips in which vehicle 100 is driven at least to 1 km radially from the point of origin qualifies as a statistically relevant dataset.

Figure 5:
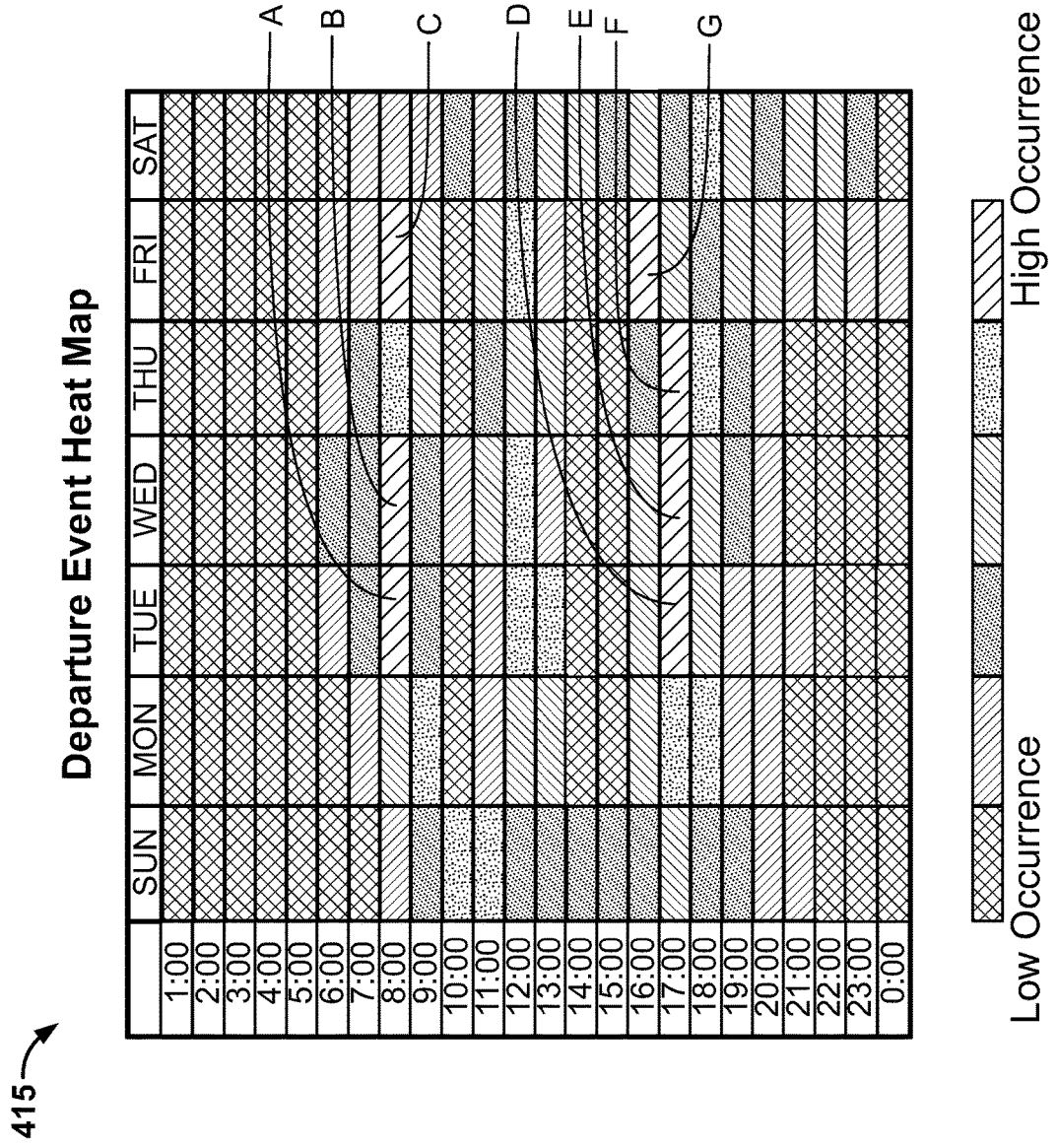
FIG. 5 illustrates an aspect of the vehicle wireless beacon scheduling system of the instant disclosure.

In one embodiment, system 400 is configured to record the day, date, time and the distance of any trip in which the radial distance from the vehicle's originating location exceeds 1 km. In the embodiment shown in FIG. 4, user heat map module 414 of beacon optimizer module 410 of system 400 is configured to record such information. Upon accumulation and storing of a statistically relevant number of trips in which the radial distance from the vehicle's originating location exceeds 1 km, user heat map module 414 of beacon optimizer module 410 of system 400 is configured to produce a table and/or map reflecting the relative frequency of trips taken, for example, for each time of day and for each day of a week. FIG. 5 shows an exemplary map 415 that user heat map module 414 may create reflecting a driver's relative frequency of trips taken in an exemplary week, including the time of day and the day in the week. In this example, the driver initiated a trip most often on Tuesday (A), Wednesday (B), and Friday (C) at approximately 8:00 am, on Tuesday (D), Wednesday (E), and Thursday (F) at approximately 5:00 pm, and on Friday (G) at 4:00 pm. System 400 may be configured to continually update the stored trip data to reflect additional trips taken by the driver and to reflect any changes in the driver's driving patterns.

In the embodiment of FIG. 4, user data module 416 of beacon optimizer module 410 of system 400 is configured to receive user calendar data 406 including data from an electronic calendar associated with the driver. User calendar data 406 may include data regarding the driver's calendared items, including the driver's appointments, tasks, meetings, and the like, as well as the time and place associated with such calendared items. System 400 may be configured to convert the address or identity of the place associated with a calendared item to a geocoded location. To learn the driver's driving patterns, system 400 may be configured to ignore or disregard a calendared item if it determines that the radial distance to a place associated with such calendared item from the predicted starting location for vehicle 100 is less than a desired threshold distance.

In some embodiments, when the place for a calendared item, such as the location for a meeting, is not among the user calendar data 406 received by system 400, system 400 may nevertheless be configured to determine the location for the calendared item based on the driver's prior driving history at the same time of day, day of the week, week of the year, and month of the year associated with the calendared item. In one embodiment, if the driver frequently has a meeting on his electronic calendar hypothetically noted at "Meeting in Building 25" without an address associated with the calendar entry, system 400 may be configured to create a "tag" associated with the location of where the driver parked in order to attend the "Meeting in Building 25." System 400 may automatically reverse geocode the tagged location and thereafter associate that location with future meetings in the driver's calendar noted as being in Building 25. System 400 may be configured to allow a driver to "opt-out" of any feature of system 400. For example, the driver may select or otherwise configure system 400 to not record or otherwise learn the driver's parking and driving habits.

In the embodiment of FIG. 4, user data module 416 of beacon optimizer module 410 of system 400 is configured to receive user social media data 408 including data from any of the driver's social media data sources or networks including Facebook® and the like. User social media data 408 may include data regarding the driver's scheduled or planned destinations, including the driver's appointments, tasks, meetings, and the like, as well as the time and place associated with such planned destinations. System 400 may be configured to convert the address or identity of the place associated with a planned destination to a geocoded location. To learn the driver's driving patterns, system 400 may be configured to ignore or disregard a planned destination received from among social media data 408 if it determines that the radial distance to a place associated with such planned destination from the predicted starting location for vehicle 100 is less than a desired threshold distance.

User calendar data 406 and user social media data 408 may reside in memory on the driver's mobile phone, personal data assistant, personal computer, or other electronic device including a computer server or a cloud storage medium. User calendar data 406 and user social media data 408 may be synchronized with or otherwise received by system 400 at any desired time and at any desired interval, regardless of whether the driver is in or near vehicle 100 or within Bluetooth range of vehicle 100. System 400 may poll or otherwise retrieve user calendar data 406 and user social media data 408 from memory associated with any such electronic device. Data synchronization and/or retrieval may occur using any one of a number of data protocols, and may be received by system 400 using any wireless or wired data connection method, including a cellular connection, a satellite connection, a W-Fi connection, Bluetooth, near field communication, and USB. System 400 may automatically select a wireless data connection method according to the strength of the signal from the associated communication method or network.

System 400 may employ an Application Program Interface ("API") as an interface and/or to act as a protocol to communicate user calendar data 406 and/or user social media data 408 between either or both of user heat map module 414 and user data module 416 and any computer-readable medium on which user calendar data 406 and/or user social media data 408 resides. In some embodiments, the driver may "opt-in" or otherwise grant authorization to any cloud data service provider with whom the driver has an account, such as Google®, Facebook®, Microsoft Outlook®, and the like, to permit the cloud data service provider to receive data from system 400 or to push data to system 400. In some embodiments, as discussed more fully below, one or more vehicle modules may be awakened automatically by the cloud service provider to cause system 400 to precondition one or more settings of vehicle 100 in anticipation of a trip by the driver according to data stored by the cloud data service provider and regardless of whether the driver and/or her portable electronic device is within Bluetooth range of the vehicle 100. To further integrate user calendar data 406 and user social media data 408 into system 400, system 400 may determine frequently visited locations and cluster them according to non-geocoded meeting locations and scheduled events at those locations.

The driver may select or otherwise configure how much time in advance of an anticipated trip that the vehicle settings will be preconditioned in anticipation of the trip. For example, the driver may select that the vehicle 100 be preconditioned 2 minutes, 5 minutes, or 10 minutes, etc. before the computed departure time. In some embodiments, the driver may select a staggered timing of preconditioning the vehicle settings. For example, system 400 may be configured to initiate engine start and set climate control settings 10 minutes in advance of a trip to warm the vehicle ahead of the driver's approach to the vehicle, and may be configured to set the door locks to the unlock position 30 seconds ahead of the driver's approach to the vehicle.

Upon determining, by the user heat map module 414, data reflecting the relative frequency of trips taken by the driver of vehicle 100 for each time of day and for each day of a week, and/or upon receiving user calendar data 406 and user social media data 408 by user data module 416, system 400 may then dynamically adjust emission of BLE signals from vehicle 100 to match or at least approximate the driver's driving start time pattern or the driver's calendar data 406 and user social media data 408 in anticipation of a trip. To do this, user departure prediction module 418 may be configured to compute the probability of a driver entering vehicle 100 to depart an originating location at any given time of day and for any given day of the week or month. In one embodiment, user departure prediction module 418 is configured to analyze the generated data reflecting the relative frequency of trips taken by the driver of vehicle 100, and apply a weighting system to the probable trips identified by the user heat map module 414 and the user data module 416.

Ping rate optimizer module 420 of beacon optimizer module 410 of system 400 may be configured to use the output from the user departure prediction module 418 to then determine when to dynamically modify the BLE transmission patterns, from a default transmission pattern, based on the calculated probability of when a predicted trip may occur. For example, if a vehicle's default BLE transmission rate is once every two minutes, then ping rate optimizer module 420 may be configured to modify the BLE transmission rate to occur, for example, every 15 seconds during periods when the probability that the driver will embark on a trip from a particular location are highest.

Ping rate optimizer module 420 may be configured to modify the duration of the BLE transmissions to occur at the modified transmission rate. In one embodiment, the BLE transmissions occur every 15 seconds for the first 5 minutes and then every 30 seconds for the next 10 minutes. Any combination of transmission rate and transmission duration may be employed during the periods by system 400 to accommodate varying levels of confidence that the driver will depart for a trip in vehicle 100 at any given time.

Ping rate optimizer module 420 may be configured to decrease the BLE transmission rate during periods when the probability that the driver will embark on a trip from a particular location are high, but not as high as the highest probability. Ping rate optimizer module 420 may be configured to further decrease the BLE transmission rate during periods when the probability that the driver will embark on a trip from a particular location are relatively low. Ping rate optimizer module 420 may be configured to substantially decrease BLE transmissions or altogether cease BLE transmissions when the probability that the driver will embark on a trip from a particular location are very low or zero, such as when the vehicle 100 is parked overnight or when, for example, the vehicle 100 is parked at an airport long term parking lot, as may be learned by system 400 by reverse geocoding of the vehicle's location.

Figure 6:
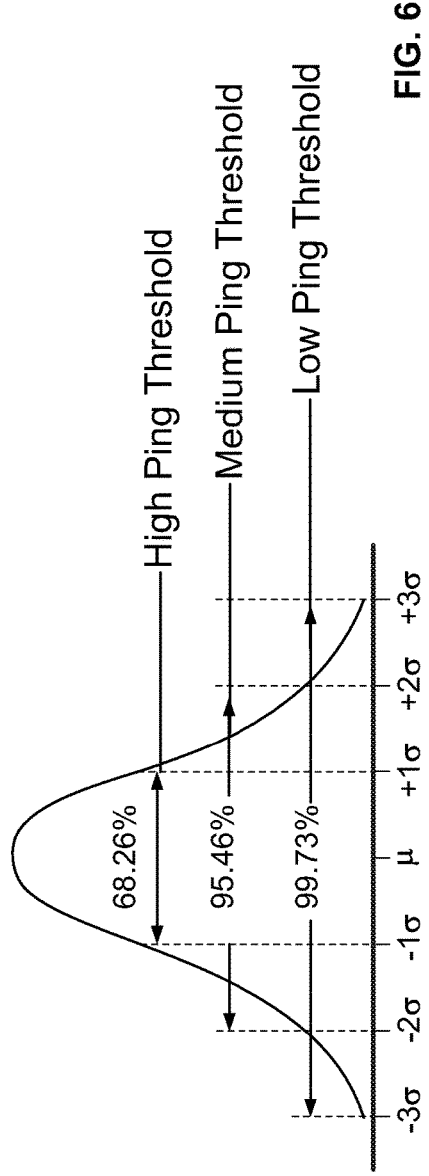
FIG. 6 illustrates another aspect of the vehicle wireless beacon scheduling system of the instant disclosure.

FIG. 6 shows one example of how system 400 may be configured to dynamically modify BLE transmission patterns from vehicle 100 based on the probability that the driver will take a trip, resulting in improved vehicle battery utilization, chances that the driver will be within Bluetooth range of the vehicle before departing on a trip, and speed at which system 400 registers a wireless connection with the driver's electronic device, to name a few. For example, system 400 may be configured to initiate BLE transmissions at a relatively high rate when the computed probability that the driver will embark on a trip from a particular location is approximately +/1 sigma (i.e., +/− one standard deviation or approx. 68.26%) of the mean of the sample of data. System 400 may be configured to initiate BLE transmissions at a relatively medium rate when the computed probability that the driver will embark on a trip from a particular location is approximately +/2 sigma (i.e., +/− two standard deviations or approx. 95.46%) of the mean of the sample of data. System 400 may also be configured to initiate BLE transmissions at a relatively low rate when the computed probability that the driver will embark on a trip from a particular location is approximately +/3 sigma (i.e., +/− three standard deviations or approx. 99.73%) of the mean of the sample of data. System 400 may be configured to initiate BLE transmissions at any rate as may be desired.

In some situations, a driver's keyfob may be used by another driver, which may skew the data that system 400 receives to learn the driver's driving behavior. To further improve accuracy of BLE transmissions, system 400 may be configured to use both user calendar data 406 and user social media data 408 or at least one of user calendar data 406 and user social media data 408 together with at least one other data input, such as data from user heat map module 414. In one embodiment, system 400 uses data from the driver's portable phone, such as its MAC address, to confirm the likely identity of a driver of the vehicle 100. In this embodiment, system 400 may also use and/or coordinate signals with an application loaded on the phone's memory to signal system 400 of the driver's approach to the vehicle 100.

Upon determining a modified BLE transmission rate for any given time of day and for any given day of a week, beacon scheduler module 412 is configured to receive the dynamically modified BLE transmission pattern data from the ping rate optimizer module 420 and schedules the BLE transmissions to occur at the days, times and rates that are either manually input or selected by the driver or otherwise determined by system 400, or both.

Figure 7:
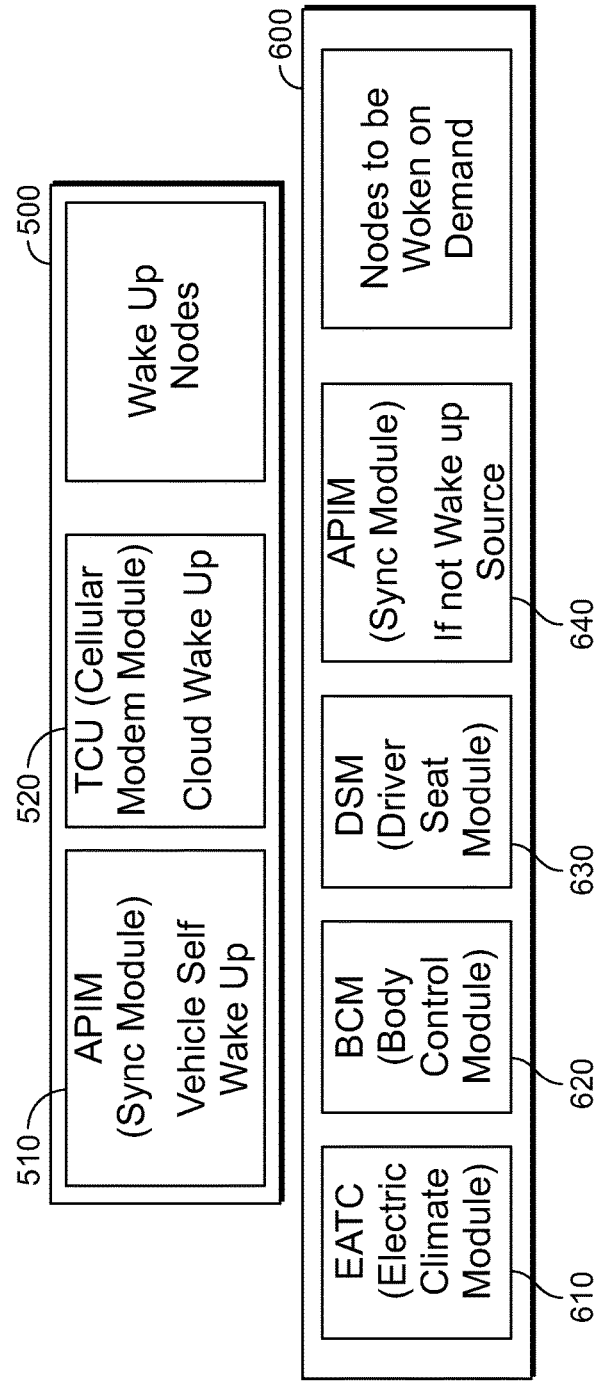
FIG. 7 illustrates yet another aspect of the vehicle wireless beacon scheduling system of the instant disclosure.

Turning now to FIG. 7, there is shown various vehicle electronic modules that may be connected to system 400. These modules may, for example, control any number of vehicle devices, subsystems, and settings. For example, vehicle 100 may include various wake up nodes 500 and on demand nodes 600, which may be awakened on demand. Wake up nodes 500 may include a vehicle infotainment system module 510, such as an Accessory Protocol Interface Module (APIM), and a cellular modem module 520, such as a Telematics Control Unit (TCU).

The vehicle infotainment system module 510 may include a clock or is connected to a clock onboard the vehicle 100 and is configured to wake up by itself according to one or more programmed time settings, which time settings may be the result of a trip prediction analysis performed by beacon optimizer module 410 as described above. The vehicle's infotainment system module 510 may receive GPS signals, Bluetooth signals, W-Fi signals or any other wireless signals for which it is programmed to receive, and upon receipt of those signals, infotainment system module 510 may, in turn, cause or enable system 400 to set in motion the preloading, preconfiguring, or activation of any one or more of a plurality of settings or controls of vehicle 100 described above. Thus, when the driver "opts-in" or otherwise grants authorization to a cloud data service provider with whom the driver has an account to permit the cloud data service provider to receive data from system 400 or to push data to system 400 via infotainment system module 510 in anticipation of a trip by the driver according to data stored by the cloud data service provider and regardless of whether the driver and/or her portable electronic device is within Bluetooth range of the vehicle 100. Similarly, the vehicle's cellular modem module 520, such as a Telematics Control Unit (TCU), may operate to receive cellular signals from the cloud service provider, and in turn, cause or enable system 400 to set in motion the preloading, preconfiguring, or activation of any one or more of a plurality of settings or controls of vehicle 100 described above, such as by opening or causing to be opened any module that controls such respective settings or controls of vehicle 100.

On demand nodes 600 may include an electric climate module 610, such as an Electronic Temperature Control (EATC), a body control module 620, a driver seat module 630, and a vehicle infotainment system module 640, such as an Accessory Protocol Interface Module (APIM). The vehicle infotainment system module 510 may be the same unit as the vehicle infotainment system module 640 which may be awakened by receiving a signal from the cellular modem module 520 connected to a cloud service provider. On receipt of cellular signals from the cloud service provider, the vehicle's cellular modem module 520 may be configured to wake up the infotainment system module 640 to cause or enable system 400 to set in motion the preloading, preconfiguring, or activation of any one or more of a plurality of settings or controls of vehicle 100 described above. Wake up nodes 500 and on demand nodes 600 may include one or more other modules, including those created in the future.

On demand nodes 600 may be configured to receive signals from a driver or her electronic device such as a key fob, whenever desired by the driver to cause or enable system 400 to set in motion the preloading, preconfiguring, or activation of any one or more of a plurality of settings or controls of vehicle 100 described above. The electric climate module 610, which may be configured for automatically control the temperature in the cabin of the vehicle 100, body control module 620, which may be configured to control keyfob authentication, window position, door locks position, activation/deactivation of the vehicle alarm, and interior/exterior lighting settings, driver seat module 630, which may be configured to control, for example, seat position and heating and cooling of the seats, and vehicle infotainment system module 640, which may be configured to control or allow a driver to make hands-free telephone calls, change audio settings and perform other functions with the use of voice commands, may all be awakened on-demand by the driver.

While specific embodiments have been described in detail, it will be appreciated by those skilled in the art that various modifications and alternatives to those details could be developed in light of the overall teachings of the disclosure. Accordingly, the disclosure herein is meant to be illustrative only and not limiting as to its scope and should be given the full breadth of the appended claims and any equivalents thereof.

What is claimed is:

1. A system comprising:
  a vehicle including a processor and memory;
  a departure prediction module to determine a departure probability based upon driving patterns of a driver, GPS positions data, time data, driver calendar data, and driver social media data;
  a ping rate module to:
  increase a transmission rate, based upon the departure probability, from a default transmission rate to an increased transmission rate at a predetermined transmission time for a predetermined transmission duration for signals to detect the driver;
  select a first transmission rate for a first portion of the predetermined transmission duration and a second transmission rate that is less than the first transmission rate for a second portion of the predetermined transmission duration that occurs after and is longer than the first portion; and
  adjust an amount of increase from the default transmission rate to the increased transmission rate, wherein the amount of increase is variable with respect to the GPS position data, the time data, the driver calendar data, and the driver social media data; and
  a beacon module to preconfigure a driver setting before a predicted trip upon detecting that the driver is within range of the ping rate module.

2. The system of claim 1, wherein the beacon module is configured to receive at least one of real-time data and historical data comprising the driving patterns of the driver.

3. The system of claim 2, wherein the at least one of real-time data and historical data include at least one of a trip start time, an originating location of the vehicle, a distance driven in the trip, a destination to which the vehicle is driven, location data including discrete geo-location data of the vehicle along a path driven, a duration of the trip, a duration of any temporary stops taken along a path driven, a location of such temporary stops, and an identity of a landmark or an address at or near each such temporary stop, the originating location, and the destination.

4. The system of claim 2, wherein the at least one of real-time data and historical data include the GPS position data and the time data that are associated with each of the position data of the vehicle.

5. The system of claim 2, wherein the at least one of real-time data and historical data include at least one of the driver calendar data and the driver social media data, wherein the beacon module includes a driver data module coupled to the processor and configured to wirelessly synchronize the driver calendar data and the driver social media data residing in the memory on the vehicle with the driver calendar data and the driver social media data residing in memory on a cloud storage device, and wherein the departure prediction module is coupled to the processor and configured to determine the departure probability for a determined time of day and day of week based on the synchronized driver calendar data and the driver social media data.

6. The system of claim 2, wherein the ping rate module selects the increased transmission rate based upon a standard deviation of the historical data of the driving patterns of the driver.

7. The system of claim 1, wherein the beacon module includes a driver heat map module coupled to the processor and configured to identify the driving patterns of the driver with the vehicle, wherein the driver heat map module is configured to determine whether a driven distance of the trip from origin to the destination as measured linearly from the origin exceeds a threshold amount, the threshold amount being non-zero.

8. The system of claim 7, wherein the departure prediction module is coupled to the processor and configured to determine the departure probability for a determined time of day and day of week based on the driving patterns of the driver with the vehicle.

9. The system of claim 8, wherein the signals for detecting the driver in a vicinity of the vehicle are Bluetooth Low Energy (BLE) signals.

10. The system of claim 9, wherein the driver heat map module is configured to register a presence of the driver in the vicinity of the vehicle.

11. The system of claim 9, including a beacon scheduler module coupled to the processor and configured to transmit BLE signals from the vehicle at the predetermined transmission time, the increased transmission rate, and over the predetermined transmission duration.

12. The system of claim 7, wherein the beacon module is configured to:
determine whether the driven distance of the trip is less than the threshold amount; and
disregard the trip in response to determining that the driven distance of the predicted trip is less than the threshold amount.

13. The system of claim 1, wherein, based upon the departure probability, the ping rate module selects the first transmission rate of the first portion of the predetermined transmission duration, a first duration for the first portion, the second transmission rate of the second portion, and a second duration for the second portion.

14. The system of claim 1, wherein the departure prediction module is to further:
responsive to the driver calendar data including a user-submitted calendared item that is not associated with any location, associate a location at which the vehicle is parked to the user-submitted calendared item at a time at which the user-submitted calendared item is occurring.

15. The system of claim 1, wherein the departure prediction module is to further:
generate a probability graph based the GPS position data, the time data, the driver calendar data, and the driver social media data;
responsive to a probability at which the driver will embark on the predicted trip being at one standard deviation away from a mean of the probability graph, adjust the amount of increase from the default transmission rate to the increased transmission rate to a first amount;
responsive to the probability at which the driver will embark on the predicted trip being at two standard deviation away from the mean of the probability graph, adjust the amount of increase from the default transmission rate to the increased transmission rate to a second amount; and
responsive to the probability at which the driver will embark on the predicted trip being at three standard deviation away from the mean of the probability graph, adjust the amount of increase from the default transmission rate to the increased transmission rate to a third amount,
wherein the first amount is greater than the second amount and the third amount, and the second amount is greater than the third amount.

16. A vehicle wireless beacon scheduling system, comprising:
a vehicle including steering, an accelerator, brakes, a processor, and memory;
a beacon optimizer module coupled to the processor comprising driver driving pattern data stored in the memory;
a departure prediction module coupled to the processor and configured to determine a departure probability of the vehicle based upon the driver driving pattern data, GPS position data, time data, driver calendar data, and driver social media data;
a beacon scheduler module coupled to the processor and configured to transmit Bluetooth Low Energy (BLE) data from the vehicle in advance of a predicted trip in the vehicle by a driver based on the driver driving pattern data; and
a ping rate optimizer module to:
increase a transmission rate for transmission of the BLE data, based upon the departure probability, from a default transmission rate to an increased transmission rate at a predetermined transmission time for a predetermined transmission duration;
select a first transmission rate for a first portion of the predetermined transmission duration and a second transmission rate that is less than the first transmission rate for a second portion of the predetermined transmission duration that occurs after and is longer than the first portion; and
adjust an amount of increase from the default transmission rate to the increased transmission rate, wherein the amount of increase is variable with respect to the GPS position data, the time data, the driver calendar data, and the driver social media data,
wherein the beacon scheduler module is configured to preconfigure at least one driver setting of the vehicle in advance of the predicted trip in the vehicle in response to a detection of the driver in a vicinity of the vehicle via the BLE data.

17. The system of claim 16, wherein the driver driving pattern data include at least one of a trip start time, an originating location of the vehicle, a distance driven in the trip, a destination to which the vehicle is driven, location data including discrete geo-location data of the vehicle along a path driven, a duration of the trip, a duration of any temporary stops taken along a path driven, a location of such temporary stops, and an identity of a landmark or an address at or near each such temporary stop, the originating location, and the destination.

18. The system of claim 16, wherein the beacon optimizer module includes a driver data module coupled to the processor and configured to wirelessly synchronize driver calendar data and driver social media data residing in the memory on the vehicle with driver calendar data and driver social media data residing in memory on a cloud storage device.

19. The system of claim 18, wherein the departure prediction module coupled is configured to determine the departure probability of the vehicle based on the driver calendar data and the driver social media data that are synchronized.

20. A vehicle wireless beacon scheduling system, comprising:
- a vehicle including steering, an accelerator, brakes, a processor, and memory;
- a beacon optimizer module coupled to the processor comprising driver driving pattern data stored in the memory, the beacon optimizer module configured to:
  - determine a departure probability of the vehicle based upon the driver driving pattern data, GPS, position data, time data, driver calendar data, and driver social media data, wherein the driver driving pattern data is based upon a driver heat map module collecting a threshold number of data points for the driver driving pattern data, and wherein the driver heat map module is configured to determine whether a driven distance of a trip exceeds a threshold amount that is non-zero and disregard the trip in response to determining that the driven distance is less than the threshold amount; and
  - preconfigure a driver setting of the vehicle in advance of a predicted trip in the vehicle in response to a detection of a driver in a vicinity of the vehicle via Bluetooth Low Energy (BLE) data; and
- a beacon scheduler module coupled to the processor and configured to:
  - transmit the BLE data from the vehicle in advance of the predicted trip in the vehicle by the driver based on the driver driving pattern data;
  - dynamically increase a transmission rate for transmission of the BLE data from the vehicle, based on the departure probability of the driver in the vehicle, from a default transmission rate to an increased transmission rate for a predetermined transmission duration; and
  - adjust an amount of increase from the default from the default transmission rate to the increased transmission rate, wherein the amount of increase is variable with respect to the GPS position data, the time data, the driver calendar data, and the driver social media data.

21. The system of claim 20, wherein the beacon optimizer module includes a departure prediction module coupled to the processor and configured to determine the probability of departure in the vehicle based on the driver driving pattern data.

22. The system of claim 20, wherein, based upon the departure probability, the ping rate module selects a first transmission rate for a first portion of the predetermined transmission duration and a second transmission rate for a second portion of the predetermined transmission duration, the second transmission rate being less than the first transmission rate, the second portion being greater than and occurring after the first portion.

* * * * *